United States Patent [19]
Oshima

[11] 3,938,753
[45] Feb. 17, 1976

[54] FILM TENSION MAINTENANCE MEANS FOR USE IN ROLL-FILM CAMERA

[75] Inventor: Shigeru Oshima, Tokyo, Japan

[73] Assignee: Fuji Photo Film Co., Ltd., Minami-ashigara, Japan

[22] Filed: Aug. 14, 1974

[21] Appl. No.: 497,448

[30] Foreign Application Priority Data
Aug. 17, 1973  Japan.......................... 48-96543[U]

[52] U.S. Cl. ............... 242/71.2; 242/75; 242/156.1
[51] Int. Cl.². ......................................... B65H 77/00
[58] Field of Search ............. 242/71, 71.1, 71.2, 75, 242/75.4, 195, 197, 156.1; 206/53, 54, 55

[56] References Cited
UNITED STATES PATENTS

| 1,250,792 | 12/1917 | Burdette | 242/71 |
| 2,029,476 | 2/1936 | Githens | 242/71 X |
| 2,928,538 | 3/1960 | Mills | 206/53 |
| 3,804,351 | 4/1974 | Kaneko et al. | 242/199 |
| 3,836,984 | 9/1974 | Hertel et al. | 242/71.2 X |

Primary Examiner—Stanley N. Gilreath
Assistant Examiner—John M. Jillions
Attorney, Agent, or Firm—Sughrue, Rothwell, Mion, Zinn & Macpeak

[57] ABSTRACT

A film tension maintenance means for use in a roll-film camera comprising a simply mounted, expandable clasp element, which exerts evenly distributed force on opposite sides of a take-up spool and maintains the take-up spool in a vertical alignment, and steadily expands as film is wound onto the take-up spool, while maintaining pressure countering any tendency of the wound film to uncoil, thereby to ensure unhindered film wind-up and accurate advance of successive film frames to an exposure position.

1 Claim, 4 Drawing Figures

FILM TENSION MAINTENANCE MEANS FOR USE IN ROLL-FILM CAMERA

BACKGROUND OF THE INVENTION

1. FIELD OF THE INVENTION

The present invention relates to a roll-film camera, and more particularly to means for maintenance of requisite tension in film contained therein.

2. DESCRIPTION OF THE PRIOR ART

There is known a type of camera wherein loading or unloading of film is effected only by a dealer or staff of a photographic store, or similar establishment, and not usually by the photographer who actually uses the camera, the camera being supplied as a unit complete with a loaded roll of film to the photographer, who, after exposing all the frames of the roll simply returns the camera to a dealer, for film extraction and development, and purchases, or receives in exchange, another camera containing a fresh roll or film.

Rather than having the object of making it possible to take photographs in almost any conditions, this type of camera usually permits only one or two shutter settings, and is limited to taking photographs in average daylight conditions, but presents the advantages of extreme ease of manipulation and of very low cost, this low cost being made possible by keeping camera constructional elements to a minimum.

This type of camera generally employs film in roll form, rather than in a cassette, for example, film being supplied on a flanged feed spool from which it is gradually unwound, successive film frames being moved to a position for exposure, and then wound onto a flanged take-up spool mounted on and driven by a shaft, which is rotatable upon actuation of a suitable means by a photographer. To keep camera construction as simple as possible, it is desirable to hold film steady in position for exposure simply by tension between spools, but a disadvantage in conventional cameras of this type is that uniform tension in film is not always maintained simply by action of the take-up spool drive shaft, since as more frames of film are exposed the amount of film on the take-up spool increases, with the result that it becomes increasingly difficult to ensure that exposed film remains wound up tightly on the take-up shaft and there is a certain amount of slack in the film, which may therefore fail to be moved into a correct alignment for exposure, or when the take-up spool remains unmoved, there is a slight unwinding of film from the take-up shaft, resulting in pressure which actually pushes film backwards and moves a film frame out of a correct exposure position.

Another disadvantage of conventional cameras is that it only needs a very slight misalignment of the drive shaft of the take-up spool for film to spiral on the take-up spool, resulting in film advance becoming difficult or impossible, and film frames not being properly aligned for correct exposure.

It is accordingly an object of the present invention to provide a simple means for ensuring maintenance of tension in a film being wound up in a camera.

It is another object of the invention to provide a film tension maintenance means which also provides support for and ensures maintenance of vertical alignment of a film take-up spool, without a support and drive shaft being necessary.

SUMMARY OF THE INVENTION

In accomplishing these and other objects, there is provided according to the present invention, an expandable, caliper-shaped clasp elements having a base portion, which is mountable in a camera slot portion communicating with a take-up spool chamber in a camera, and from which extend two arms, which, when in a condition of repose, close towards one another, and which, when the clasp element is mounted in a camera, may clasp a take-up spool and film wound up thereon, the take-up spool having a base portion which is seated on and engaged by an externally actuable geared wheel, and being always maintained in a vertical alignment by the clasp element, and film wound onto the take-up spool being always maintained in a tightly wound condition by the pressure exerted by the clasp element due to the arms thereof being gradually opened against their natural tendency by wound-up film.

BRIEF DESCRIPTION OF THE DRAWINGS

A better understanding of the present invention may be had from the following full description thereof when read in reference to the attached drawings, in which like numbers refer to like parts.

DESCRIPTION OF THE PREFERRED EMBODIMENT

Figure 1:
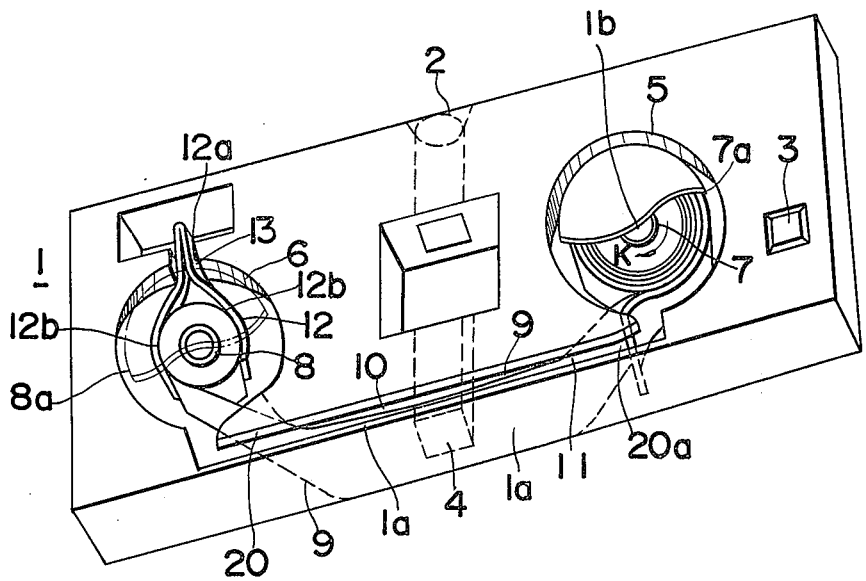
FIG. 1 is a prespective view of a camera having mounted therein a film tension maintenance means according to one embodiment of the invention.

Referring first to FIG. 1, there is shown a miniature camera for roll film, which comprises a camera body 1, a detachable cover, not shown, for lightproof protection of the camera body interior, a lens, or lens system 2, and a shutter button 3 for actuation of a shutter means, not shown, said lens 2 and shutter button 3 being provided within the camera body 1 in a known manner. Film 9 for use in the camera body 1 is initially provided on a feed spool 7, which has a large end-flange 7a, and is rotatably mounted on a fixed shaft 1b, or in another suitable manner, in an open-topped chamber 5 formed in a right-hand rear portion of the camera body 1. From the feed spool 7, the film 9 is led obliquely rearwards, under an eave portion 20a for prevention of upward displacement of the film 9, and then into and through a passageway 11, which lies parallel to the longitudinal axis of the camera body 1, i.e., at right-angles to the optical axis 4 of the lens 2, and is defined by the camera bottom floor, camera rear wall 1 a, and an inner wall 10, which is parallel to and slightly separated from the rear wall 1a, and in a generally central portion of which there is formed an opening which is in line with the lens optical axis 4, and through which successive frames of the film 9 passed through the passageway 9 may be exposed upon actuation of the camera shutter means by depression of the shutter button 3 in a known manner. From the other end of the passageway 11, the film 9, which has been exposed, is led obliquely forwards, under another eave portion 20b, and is wound onto a take-up spool 8, which is accommodated in a chamber 6 formed in a left-hand rear portion of the camera body 1, in line with the feed spool chamber 5.

Figure 2:
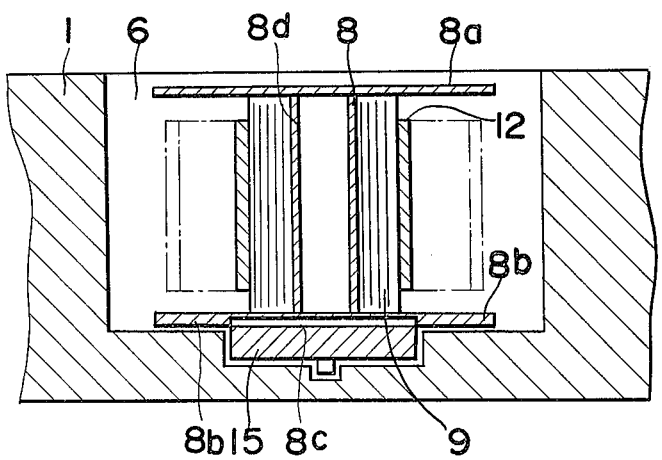
FIG. 2 is a cross-sectional view showing a take-up spool held by the means of the invention.

As shown in FIG. 2, the take-up spool 8 has flanges 8a and 8b at opposite ends thereof, the flange 8a being uppermost when the take-up spool is loaded in the camera body 1. In the outer side of the other flange 8b there is formed a circular recess 8c whose circumferrential side wall forms a geared surface. The take-up spool is seated on a wheel 15, whose periphery forms an external gear, and which is rotatably and horizontally mounted in the base of the chamber 6, the recess 8c of the spool bottom flange 8b fitting around and engaging the upper portion of the periphery of the wheel 15, whereby rotation of the wheel 15 causes roration of the take-up spool 8. The wheel 15 is rotatable by means of, for example, a lever, not shown, which extends to the exterior of the camera body 1 and is actuable by a photographer. It is to be noted that the wheel 15, as well as effecting rotatory drive of the take-up spool 8, also provides a broad base for support thereof, this manner of supporting the spool 8 presenting the advantage that problems such as those due to shaft wobble in shaft-mounted take-up spools, for example, are avoided, and the axis of rotation of the spool 8 remains constant, permitting smooth wind-up of film 9.

Figure 3:
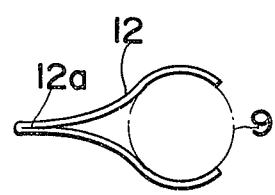
FIG. 3 is a plane view of the means of the invention.
Figure 4:
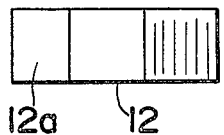
FIG. 4 is a schematic side view of the means of the invention.

Referring back to FIG. 1, and also referring to FIGS. 3 and 4, the main portion 8' of the take-up spool 8, together with any film 9 wound up thereof, is held by a clasp element 12, which is constituted by a strip of material which has tensile proterties, and is bent to form the general shape of a calipers having a junction 12a from which extends two curved arms 12b. The junction 12a of the clasp element 12 may be fitted into a slot 13, which communicates with the forwards side of the take-up spool chamber 6, in which configuration the clasp element 12 is held in place in the camera body 1, and the arms 12b thereof extend rearwards to opposite sides of the take-up spool 8. Due to the tensile properties of the clasp element 12, the arms 12b thereof always tend to close, or at least to move towards one another to an extent such that the distance therebetween is less than the diameter of the take-up spool main portion 8d, whereby, even with little or no film 9 on the take-up spool 8, the clasp element 12 may grip the spool 8 and hold it in a vertical alignment on the wheel 15. When film 9 is wound up onto the take-up spool 8, the clasp element arms 12b are forced outwards (for example, to the positions indicated by the chain-dot line portions of FIG. 2), while maintaining a constant pressure to keep the film 9 tightly wound.

To load film 9 into the camera body 1, a certain amount of film 9 is unwound from a full feed spool 7, the loose end of this film 9 is attached to and slightly wound around an empty take-up spool 8, the clasp element arms 12b are fitted around the main portion 8d of the take-up spool 8, the spools 7 and 8 are mounted in their respective chambers 5 and 6, at this time the junction 12a of the clasp element 12 being fitted into the slot 13, the stretch of film 9 between the spools 7 and 8 is slotted into the passageway 11, and then the film advance lever not shown is actuated to cause rotation of the wheel 15 and so also of the take-up spool 8, which accordinly takes-up the slack of the film 9, whereby the film 9, while still passing through the passageway 11, is tautened between the spools 7 and 8, and the stretches thereof between the feed spool 7 and the entrance of the passageway 11, and between the exit of the passageway 11 and the take-up spool 8, post, respectively, and beneath the projecting eave portions 20a and 20b, which prevent any vertical displacement of the film 9. The camera body 1 is then sealed by a top cover, not shown, and so is ready for use. As successive photographs are taken, and more and more film 9 is wound onto the take-up spool 8, the clasp element arms 12b are moved outwards, as noted earlier. Verticality of the take-up spool 8, and hence trouble-free film wind-up thereby, is ensured however much film 9, is wound up therein, since the take-up spool 8 is supported on a broad base, and since the clasp element 12 always imposes an inwardly directed holding force which naturally tends to be evenly distributed between the oppositely-acting arms 12b. This is in contrast to, for example, an otherwise unsupported take-up spool which is mounted on a shaft, and which, as film is wound up thereon is subjected to an off-center force tending to pull it out of vertical alignment, this force becoming more and more off-center as more and more film is wound up. The clasp element 12 also ensures that film 9 remains tightly wound on the take-up spool 8, and does not tend to move back due to natural elasticity of the film material, in between shots for example. It is to be noted that since the clasp element arms 12b are gradually moved outwards against their natural tendency as the amount of film 9 on the take-up spool 8 is increased, the action of the clasp element 12 to keep the film 9 tightly wound on the spool 8 is steadily re-inforced, and so automatically counters the increasing tendency of the film 9 to unwind. On the other hand, when all the frames of the film 9 have been exposed and the film 9 is wound back, the clasp element 12 maintains a steady pressure ensuring that the film 9 is not released from the take-up spool 8 more rapidly than it is wound-up by the feed spool 7, whereby possible jamming of the film 9 during wind-back is avoided.

As is clear from the above description, the present invention provides a film tension maintenace means which is of simple inexpensive construction, but which ensures maintenance of vertically of a take-up spool, and also ensures that a requisite amount of tension is at all times maintained in a loaded film thus preventing any lateral displacement of film during film advance or jamming rewind.

What is claimed is:

1. In a camera including a camera body, a feed spool and a take-up spool rotatably mounted within said camera body, a film loaded on said feed spool and being steadily wound from said feed spool onto said take-up spool for exposure of successive film frames through a camera lens, the improvement comprising:

an expandable clasp element for tensioning said film, said element including a base portion and a pair of arms, said element being formed by a strip of tensile material bent into caliper shape to form said base portion and said two arms which extend from said base portion and tend to close towards one another, said camera body being provided with a slot to the side of said take-up spool, said slot receiving said base portion with said arms extending from said slot and being fitted around the central portion of said take-up spool and film wound thereon to grip the film and to maintain pressure thereon countering any tendency of the wound film to uncoil.

* * * * *